United States Patent Office 2,752,368
Patented June 26, 1956

2,752,368

OXIDATION OF Δ²⁰⁽²²⁾-22-TERTIARY AMINO STEROIDS

Roman P. Holysz, Kalamazoo, Mich., assignor to The Upjohn Company, Kalamazoo, Mich., a corporation of Michigan No Drawing. Application March 4, 1952, Serial No. 274,840

21 Claims. (Cl. 260—397.3)

The present invention relates to an oxidation process and is more particularly concerned with a novel process for oxidative cleavage of the side-chain of certain steroid compounds to produce 20-keto steroids.

It is an object of the present invention to provide a novel process for the oxidative cleavage of the double bond between carbon atoms 20 and 22 in the side-chain of certain steroid compounds. Another object of the present invention is the provision of a process for the oxidative cleavage of a 22-enamine compound of the bisnorcholane series, i. e., a steroid 20(22)-ene-22-amine with chromic acid. A further object of the present invention is the provision of a process for the production, in high yields, of 20-keto steroids such as, for example, progesterone, by oxidative cleavage of an unsaturated steroid side-chain. Other objects of the present invention will be apparent to those skilled in the art to which this invention pertains.

Starting materials for the process of the present invention are the 22-enamine compounds of the bisnorcholane series represented by the formula:

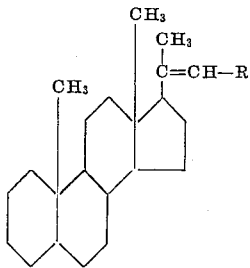

wherein —R is a tertiary amine radical attached at the nitrogen atom and selected from the group of amines consisting of dialkylamines, dicycloalkylamines, diaralkylamines, alkyl aralkylamines, aryl alkylamines, and cyclic amines wherein the nitrogen is part of the ring. The steroid nucleus may have substituents such as, for example, ketone, hydroxy, acyloxy, carboxy, carbalkoxy, and the like, attached to one or more of the carbon atoms of the nucleus such as, for example, in the 3,7,11,12 and other positions. If a secondary hydroxy group is attached to the nucleus it will be oxidized to a ketone. Such oxidation can be avoided, if desired, by first protecting the hydroxy group by any conventional means such as, for example, formation of an ester. The protecting group can then be removed after the oxidation to regenerate the hydroxy group. In addition the nucleus may contain double bonds. Double bonds such as, for example, a double bond at the four position which is conjugated with a ketone, or a hindered double bond such as a double bond in the six position of adducts of ergosterol compounds, are not disturbed under the conditions of the process of the present invention. If a reactive double bond is present in the nucleus, it can be easily protected by any of the common reagents used for that purpose such as, for example, bromine. Such protecting groups are then removed after the oxidation if desired.

The 22-enamine compounds of the bisnorcholane series are preferably prepared by heating a steroid 22-aldehyde with a secondary amine in an organic solvent, removing the water as it is formed in the course of the reaction, and isolating the enamine thus formed. The water that is formed can be removed by azeotropic distillation or by a basic inorganic water-binding agent such as potassium carbonate, calcium oxide, barium oxide and the like. Alternatively, the enamines can be prepared advantageously by contacting the steroid 22-aldehyde with at least two molecular proportions of a secondary amine at about room temperature, removing the water as it is formed, separating the aldehyde-diamine complex thus formed and heating it to between approximately forty and approximately ninety degrees centigrade in order to split out one of the amine groups, thereby introducing the desired 20(22) double bond. Conditions for the formation of such enamines include an inert atmosphere, such as nitrogen, and a reaction temperature between approximately 25 and approximately 125 degrees centigrade, preferably between forty and 110 degrees centigrade and conveniently at the reflux temperature of the reaction mixture, but always below the decomposition temperature of the ultimate reaction product, i. e., the enamine. The reaction time varies according to the reactivity of the amine and the temperature of the reaction; the heterocyclic amines such as piperidine are most reactive, the dialkylamines being intermediate, and the arylalkylamines are least reactive. Ordinarily a reaction period of from about two to forty hours is most satisfactory when a temperature within the preferred range is employed. However, if desired, the course of the reaction can be followed by spectroscopic analysis. Among the solvents which can be used are diethyl ether, tetrahydrofuran, an excess of the amine, benzene, xylene, toluene, pentane, hexane and the like.

Representative secondary amines which can be employed in the preparation of steroid enamines from steroid 22-aldehydes include dialkylamines such as, for example, diethylamine, dibutylamine, dioctylamine, and didodecylamine, and the like; cycloalkylamines such as dicyclohexylamine, dicyclopentylamine, and the like; cyclic amines such as piperidine, pyrrolidine, tetrahydroquinoline, oxazolidine (tetrahydro-oxazole), morpholine and the like; aralkyl alkylamines such as methyl benzylamine, ethyl benzylamine and the like; diaralkylamines such as dibenzylamine and the like; substituted dialkylamines such as 2,2'-dichlorodiethylamine and the like; and aryl alkylamines such as N-methylaniline, N-methyltoluidine, N-methylanisidine, and the like. However, it is preferred, for convenience and economy, to use secondary amines having molecular weights between approximately seventy and approximately 150, such as pyrrolidine, piperidine, morpholine and diethylamine.

Representative steroid aldehydes which may be used in the preparation of the starting enamines includes bisnorcholan-22-al, 3-acetoxybisnorcholan-22-al, 3-benzoyloxybisnorcholan-22-al, 3-heptanoyloxybisnorcholan-al, 3-methoxybisnorcholan-22-al, 3-benzyloxybisnorcholan-22-al, 3-ketobisnorcholan-22-al, 3-ketobisnor-4-cholen-22-al; the maleic anhydride, maleic acid, and maleic acid diester adducts of bisnor-5,7-choladien-22-al, 3-acetoxybisnor-5,7-choladien-22-al, 3-benzoyloxybisnor-5,7-choladien-22-al, 3-ethoxybisnor-5,7-choladien-22-al, 3-ketobisnor-5,7-choladien-22-al, 3-acetoxy-9,11-oxidobisnor-5,7-choladien-22-al, 3-heptanoyloxy-9,11-oxidobisnor-5,7-choladien-22-al, 3-keto-9,11-oxidobisnor-5,7-choladien-22-al, and the like. The foregoing and similar steroid aldehydes can be prepared by methods heretofore described in the art [Heyl, Centolella and Herr, J. Am. Chem. Soc., 69, 1957 (1947) and 70, 2953 (1948); Heyl and Herr, J. Am. Chem. Soc., 72, 2617 (1950); Bergmann, J. Org. Chem. 13, 10–20 (1948)].

In accordance with the process of the present invention, the 22-enamine compound of the bisnorcholane series is oxidized with chromic acid, in a solvent, to yield a 20-keto steroid. In addition to the free amine, the salts of the amine with inorganic or organic acids, and the quaternary ammonium salts prepared by the reaction of the tertiary amine with an organic halide may also be utilized as starting materials if desired. The 20-keto steroid is obtained in high yield and of a high degree of purity. Yields of over eighty per cent, and as high as 97 per cent, can be consistently obtained. Furthermore, the ease of operation and comparative inexpensiveness of the reagents makes the process extremely valuable in large scale production. The chromic acid is generally furnished by an aqueous solution of chromium trioxide or an acid solution of sodium dichromate. The amount of chromic acid employed is usually in excess, and ratios of ten moles or more of chromic acid to one mole of steroid are operative, with a ratio of one mole of steroid to about one to four moles of chromic acid being preferred. The type of solvent or solvent mixture for the reaction may be varied over a wide range. Although the preferred solvent systems, e. g., homogeneous, heterogeneous, and aqueous, are described below, other solvents and solvent systems may be used.

A. HOMOGENEOUS SYSTEMS

The steroid, in solution in an organic solvent, is admixed with a solution of sodium dichromate in a mixture of acetic acid and an organic solvent. Any of the common water-immiscible organic solvents such as, for example, benzene, chlorobenzene, methylene chloride, chloroform, and the like, are operative. Benzene is the preferred solvent. Other acids such as the lower aliphatic acids including, for example, propionic, butyric, isobutyric, pentanoic, hexanoic, heptanoic, octanoic, and the like, may be used in place of acetic acid. The reaction is preferably carried out at zero to five degrees centigrade and is complete in about three hours. Temperatures as low as the freezing point of the mixture and as high as forty degrees centigrade are operative and reaction periods of a few minutes to about eight hours or longer may be utilized.

B. HETEROGENEOUS SYSTEM

The enamine is dissolved in a water-immiscible solvent such as, for example, methylene chloride, chloroform, benzene, ethylene dichloride, and the like, with methylene chloride being preferred, and this solution is then admixed with a solution of sodium dichromate in dilute sulfuric acid. The mixture, which forms two phases, must be vigorously stirred in order to obtain proper intermixing of the two phases. The oxidation is complete in about three hours, but periods of a few minutes to about eight hours or more are operative. The reaction time is dependent on the particular enamine employed and the temperature used, which may be varied from the freezing point of the reaction mixture to about forty degrees centigrade, with about zero to about five degrees centigrade being preferred.

C. AQUEOUS SYSTEM

The enamine is dissolved in a five to twenty per cent solution of a mineral acid such as, for example, sulfuric acid or hydrochloric acid, with a ten to fifteen per cent solution of sulfuric acid being preferred, and a solution of chromium trioxide in water added thereto. The reaction is preferably conducted at a temperature of zero to five degrees centigrade, but temperatures as high as forty degrees centigrade and as low as the freezing point of the reaction mixture are operative. The reaction is generally complete in about one hour, but the time is dependent on the temperature used and the particular enamine employed. Reaction periods from a few minutes to several hours are operative.

When the oxidation is complete, the product may be isolated in any convenient manner such as, for example, extracting with an organic solvent such as chloroform, ether, methylene chloride, and the like. The residue obtained after removal of the solvent may then be crystallized, if desired, from any of the common organic solvents.

The following examples are illustrative of the process of the present invention, but are not to be construed as limiting.

PREPARATION 1.—22-N-PIPERIDINOBISNOR-4,20(22)-CHOLADIEN-3-ONE

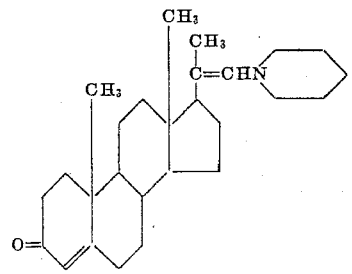

A mixture of 41.3 grams of bisnor-4-cholen-3-one-22-al (prepared as described by Heyl and Herr in J. Am. Chem. Soc., 72, 2617), 800 milliliters of thiophene-free benzene and 25 milliliters of piperidine was placed in a still-pot equipped with a reflux condenser so arranged that the condensed vapors passed through eighty grams of adsorbent anhydrous aluminum oxide particles before returning to the reaction zone, and the mixture was heated under reflux for two hours under an atmosphere of nitrogen. The benzene was then removed at subatmospheric pressure and the residue was thoroughly agitated with 160 milliliters of methanol. The methanolic extract was then cooled to about four degrees centigrade for three and one-half hours, filtered, and the filter cake washed with about ten milliliters of cold methanol and dried to obtain 33 grams of 22-N-piperidinobisnor-4,20(22)-choladien-3-one which had a melting point of 130 to 133 degrees centigrade. Upon further cooling of the filtrate, an additional 2.5 grams of material having essentially the same melting range was obtained to give a total yield of 35.5 grams (73 per cent of theory).

*Analysis.*—Per cent calculated for $C_{27}H_{41}ON$: C, 82.0; H, 10.4; N, 3.54. Found: C, 81.9; H, 10.3; N, 3.78.

PREPARATION 2.—22-N-DIBENZYLAMINOBISNOR-4,20(22)-CHOLADIEN-3-ONE

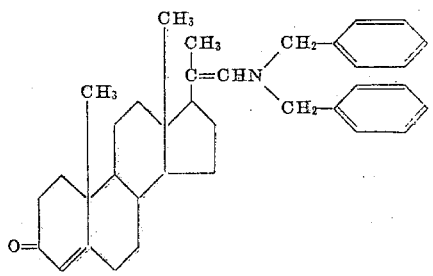

A mixture of two grams of bisnor-4-cholen-3-one-22-al (prepared as described by Heyl and Herr, J. Am. Chem. Soc., 72, 2617), 35 milliliters of anhydrous benzene and 3.4 milliliters (two molar equivalents) of dibenzylamine was heated under reflux in an atmosphere of nitrogen for one hour. The solvent was then removed by distillation at subatmospheric pressure to obtain a light-colored crystalline solid mixed with unreacted dibenzylamine. A small portion of the crystalline residue was washed with ether and its physical characteristics were determined and found to correspond to those of the starting bisnor-4-cholen-3-one-22-al. The remainder of the crystalline material was dissolved in 35 milliliters of toluene and heated under reflux in an atmosphere of nitrogen for four and one-half hours in a still-pot equipped with water-separation means. The solvent was then removed by distillation at subatmospheric pressure to obtain 22-N-dibenzylaminobisnor-4,20(22)-choladien-3-one as a viscous oil which could not be crystallized from diethyl ether, acetone, methanol, or a mixture of hexane and methanol.

PREPARATION 3.—22-N-MORPHOLINOBISNOR-4,20(22)-CHOLADIEN-3-ONE

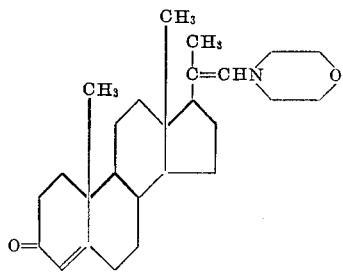

A mixture of 6.57 grams of barium oxide, 6.57 grams of bisnor-4-cholen-3-one-22-al (prepared as described by Heyl and Herr, J. Am. Chem. Soc., 72, 2617), 1.92 milliliters of morpholine and 100 milliliters of toluene was stirred for ten minutes at room temperature in an atmosphere of nitrogen and then heated under reflux for two and three-quarters hours with continued stirring. The mixture was then cooled, filtered and the filter cake washed with about fifteen milliliters of benzene. The organic filtrates were then combined and the solvents removed by distillation at subatmospheric pressure to obtain 8.19 grams of crude material from which 6.66 grams (84 per cent) of 22-N-morpholinobisnor-4,20(22)-choladien-3-one, having a melting point of 156 to 157 degrees centigrade, was obtained by trituration with 24 milliliters of cold acetone.

*Analysis.*—Per cent calculated for $C_{26}H_{39}O_2N$: C, 78.7; H, 9.89; N, 3.52. Found: C, 79.0; H, 9.70; N, 3.58.

In a manner essentially as that described in the preceding preparations, the following enamines are prepared.

(1) 22-N-diethylaminobisnor-20(22)-cholene is prepared by heating bisnorcholan-22-al with a slight excess of diethylamine.

(2) 3 - acetoxy - 22 - di - n - butylaminobisnor - 20(22)-cholene is prepared by heating 3-acetoxybisnorcholan-22-al with a slight excess of di-n-butylamine.

(3) 3 - benzyloxy - 22 - N - dioctylaminobisnor-20(22)-cholene is prepared by heating 3-benzoyloxybisnorcholan-22-al with a slight excess of dioctylamine.

(4) 3α - naphthoyloxy - 22 - N - didodecylaminobisnor-20(22)-cholene is prepared by heating 3α-naphthoyloxybisnorcholan-22-al with a slight excess of didodecylamine.

(5) 3-methoxy-22-N-dicyclohexylaminobisnor-20(22)-cholene is prepared by heating 3-methoxybisnorcholan-22-al with a slight excess of dicyclohexylamine.

(6) 3-benzyloxy-22-N-piperidinobisnor-20(22)-cholene is prepared by heating 3-benzyloxybisnorcholan-22-al with a slight excess of piperidine.

(7) 3 - keto - 22 - N - tetrahydroquinolinobisnor-20(22)-cholene is prepared by heating 3-ketobisnorcholan-22-al with a slight excess of tetrahydroquinoline.

(8) 3 - keto - 22 - N - methyl - N - benzylaminobisnor-4,20(22)-choladiene is prepared by heating 3-ketobisnor-4-cholen-22-al with a slight excess of methyl benzylamine.

(9) The dimethyl maleate adduct of 22-N-dibenzylaminobisnor-5,7,20(22)-cholatriene is prepared by heating the dimethyl maleate adduct of bisnor-5,7-choladien-22-al with a slight excess of dibenzylamine.

(10) The maleic anhydride adduct of 3-acetoxy-22-N-diethylaminobisnor-5,7,20(22)-cholatriene is prepared by heating 3-acetoxybisnor-5,7-choladien-22-al with a slight excess of diethylamine.

(11) The diethyl maleate adduct of 3-benzoyloxy-22-N-(2-methylpyrrolidino)-bisnor-5,7,20(22)-cholatriene is prepared by heating the diethyl maleate adduct of 3-benzoyloxybisnor-5,7-choladien-22-al with a slight excess of 2-methylpyrrolidine.

(12) The maleic anhydride adduct of 3-keto-22-N-morpholinobisnor-5,7,20(22)-cholatriene is prepared by heating the maleic anhydride adduct of 3-ketobisnor-5,7-choladien-22-al with a slight excess of morpholine.

(13) The dimethyl maleate adduct of 3-acetoxy-9,11-oxido-22-N-methylanilinobisnor-5,7,20(22)-cholatriene is prepared by heating the dimethyl maleate adduct of 3 - acetoxy - 9,11 - oxidobisnor - 5,7 - choladien - 22 - al with a slight excess of N-methylaniline.

*Example 1.—Homogeneous oxidation of 22-N-piperidinobisnor-4,20(22)-choladien-3-one*

Sodium dichromate dihydrate (17.9 grams) was dissolved in ninety milliliters of acetic acid and sixty milliliters of benzene. The solution was cooled to zero degress centigrade and, while being stirred, a solution of 11.9 grams of 22-N-piperidinobisnor-4,20(22)-choladien-3-one in ninety milliliters of benzene was added dropwise over a period of one hour. Stirring of the reaction mixture at zero to five degrees centigrade was continued for an additional two hours. Sixty milliliters of methanol was then added in portions over a period of fifteen minutes and stirring was continued for thirty minutes at zero to five degrees centigrade. The reaction mixture was diluted with 360 milliliters of water, the cooling bath was removed, and stirring was discontinued after thirty minutes. The two layers which formed after the addition of water were separated and the aqueous phase was extracted with one 150-milliliter portion of benzene. The benzene extract was combined with the organic phase and the combined organic phase was washed successively with fifty milliliters of water, two fifty-milliliter portions of ten per cent sodium hydroxide solution, fifty milliliters of water, fifty milliliters of ten per cent hydrochloric acid solution, and four fifty-milliliter portions of water. Concentration of the benzene solution to dryness under reduced pressure left 9.22 grams (97.7 per cent) of crystalline crude progesterone of melting point 119 to 125 degrees centigrade; $[\alpha]_D^{24}$ plus 169 degrees (dioxane). Recrystallization of the residue from thirty milliliters of cyclohexane yielded 8.0 grams (84.8 per cent) of pure progesterone which had a melting point of 124 to 128 degrees centigrade; $[\alpha]_D^{24}$ plus 173 degrees (dioxane).

*Example 2.—Heterogeneous oxidation of 22-N-piperidinobisnor-4,20(22)-choladien-3-one*

A solution of 7.92 grams (0.02 mole) of 22-N-piperidinobisnor-4,20(22)-choladien-3-one in 200 milliliters of methylene chloride was added dropwise, over a period of about seventeen minutes, to a solution of 24.84 grams (0.08 mole) of sodium dichromate dihydrate in 100 milliliters of water and 31.6 milliliters of concentrated sulfuric acid. The two-phase mixture was vigorously stirred and maintained at a temperature of about zero to five degrees centigrade during the addition and for three and one-half hours thereafter. The reaction mixture was then transferred to a separatory funnel, the methylene chloride layer separated, and the aqueous layer extracted four times with 200-milliliter portions of methylene chloride. The combined methylene chloride solution was washed successively with one normal hydrochloric acid, water, ten per cent sodium bicarbonate solution, and with water to neutrality. After drying over anhydrous sodium sulfate and removal of the solvent under reduced pressure, 6.62 grams of neutral fraction was obtained. The neutral fraction thus-obtained was treated with sodium bisulfite to remove any aldehyde (bisnor-4-cholen-3-one-22-al) present. Such treatment consisted of dissolving the neutral fraction in a mixture of fifty milliliters of ether and fifty milliliters of methanol, adding 75 milliliters of forty per cent aqueous sodium bisulfite solution, and shaking for one hour. The mixture was then extracted with ether and the ether solution was washed with water, dried over anhydrous sodium sulfate, and concentrated to dryness under reduced pressure. The residue was crude progesterone and weighed 4.17 grams (66.2 per cent). Recrystallization from fifteen milliliters of ether gave 3.06 grams (48.4 per cent) of pure progesterone of melting point 125 to 128 degrees centigrade; $[\alpha]_D^{24}$ plus 176 degrees (dioxane). An additional 0.21 gram (3.3 per cent) of product was obtained from the mother liquor and had a melting point of 121 to 125 degrees centigrade: $[\alpha]_D^{24}$ plus 174 degrees (dioxane).

*Example 3.—Oxidation of 22-N-piperidinobisnor-4,20 (22)-choladien-3-one in an aqueous medium*

A solution of 3.96 grams (0.01 mole) of 22-N-piperidinobisnor-4,20(22)-choladien-3-one in 49 milliliters of twelve per cent sulfuric acid solution was cooled by means of an ice bath and, while stirring vigorously, a solution of 1.40 grams of chromic anhydride in 25 milliliters of water was added dropwise over a period of one hour. Near the end of the addition period an additional 49 milliliters of cold twelve per cent sulfuric acid solution was added. The mixture was stirred for fifteen minutes after the chromic acid had been added and was then extracted with 300 milliliters of ether. The ether extract was washed with 25 milliliters of ten per cent sodium bisulfite solution, 25 milliliters of ten per cent sodium hydroxide solution, fifty milliliters of water, dried over sodium sulfate and concentrated to five milliliters. On cooling the ether solution deposited 0.5 gram of crystalline progesterone which melted at 124 to 126 degrees centigrade. An additional 0.13 gram was recovered from the mother liquor.

*Example 4*

In a manner essentially as described in Examples 1, 2, and 3, the following 20-ketosteroids are prepared from the corresponding 22-enamines.

(1) Progesterone is prepared by oxidation of 22-N-dibenzylaminobisnor-4,20(22)-choladiene-3-one with chromic acid.

(2) Progesterone is prepared by oxidation of 22-N-morpholinobisnor-4,20(22)-choladien-3-one with chromic acid.

(3) Progesterone is prepared by oxidation of 3-keto-22-N-methyl-N-benzylaminobisnor-4,20(22) - choladiene with chromic acid.

(4) Pregnan-20-one is prepared by oxidation of 22-N-diethylaminobisnor-20(22)-cholene with chromic acid.

(5) 3-acetoxypregnan-20-one is prepared by oxidation of 3-acetoxy-22-N-di-n-butylaminobisnor-20(22)-cholene with chromic acid.

(6) 3-methoxypregnan-20-one is prepared by oxidation of 3-methoxy-22-N-dicyclohexylaminobisnor-20(22)-cholene with chromic acid.

(7) Pregnan-3,20-dione is prepared by oxidation of 3-keto-22-N-tetrahydroquinolinobisnor-20(22)-cholene with chromic acid.

(8) The dimethyl maleate adduct of 5,7-pregnadien-20-one is prepared by oxidizing the dimethyl maleate adduct of 22-N-dibenzylaminobisnor-5,7,20(22)-cholatriene with chromic acid.

(9) The maleic anhydride adduct of 3-acetoxy-5,7-pregnadien-20-one is prepared by oxidizing the maleic anhydride adduct of 3-acetoxy-22-N-diethylaminobisnor-5,7,20(22)-cholatriene with chromic acid.

(10) The maleic anhydride adduct of 5,7-pregnadiene-3,20-dione is prepared by the oxidation of the maleic anhydride adduct of 3-keto-22-N-morpholinobisnor-5,7,20 (22)-cholatriene with chromic acid.

(11) The dimethyl maleate adduct of 3-acetoxy-9,11-oxido-5,7-pregnadien-20-one is prepared by oxidizing the dimethyl maleate adduct of 3-acetoxy-9,11-oxido-22-N-methylanilinobisnor-5,7,20(22)-cholatriene with chromic acid.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the production of a useful 20-keto steroid by the oxidative cleavage of the 20(22) double bond of a 22-tertiaryamino-20(22)-unsaturated compound of the bisnorcholane series, which includes mixing together, in a solvent, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with chromic acid, and recovering the thus-produced 20-keto steroid.

2. A process for the production of a useful 20-keto steroid by the oxidative cleavage of the 20(22) double bond of a 22-tertiaryamino-20(22)-unsaturated compound of the bisnorcholane series, which includes mixing together, in solution in a mixture of a lower aliphatic acid and a water-immiscible organic solvent, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with chromic acid, and recovering the thus-produced 20-keto steroid.

3. A process for the production of a useful 20-keto steroid by the oxidative cleavage of the 20(22) double bond of a 22-tertiaryamino-20(22)-unsaturated compound of the bisnorcholane series, which includes mixing together, in solution in a mixture of acetic acid and a water-immiscible organic solvent, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with chromic acid, and recovering the thus-produced 20-keto steroid.

4. A process for the production of a useful 20-keto steroid by the oxidative cleavage of the 20(22) double bond of a 22-tertiaryamino-20(22)-unsaturated compound of the bisnorcholane series, which includes mixing together, in solution in a mixture of acetic acid and benzene, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with chromic acid, and recovering the thus-produced 20-keto steroid.

5. A process for the production of a useful 20-keto steroid by the oxidative cleavage of the 20(22) double bond of a 22-tertiaryamino-20(22)-unsaturated compound of the bisnorcholane series, which includes mixing together, in solution in a mixture of acetic acid and a water-immiscible organic solvent, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with chromic acid, in the ratio of one mole of steroid to about one to ten moles of chromic acid, and recovering the thus-produced 20-keto steroid.

6. A process for the production of a useful 20-keto steroid by the oxidative cleavage of the 20(22) double bond of a 22-tertiaryamino-20(22)-unsaturated compound of the bisnorcholane series, which includes mixing together, in solution in a mixture of acetic acid and a water-immiscible organic solvent, at a temperature between about the freezing point of the mixture and about forty degrees centigrade, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with chromic acid, in the ratio of one mole of steroid to about one to ten moles of chromic acid, and recovering the thus-produced 20-keto steroid.

7. A process for the production of progesterone by the oxidative cleavage of the 20(22) double bond of 22-N-piperidinobisnor-4,20(22)-choladien-3-one which includes mixing together, in solution in a mixture of acetic acid and benzene, at a temperature between about the freezing point of the mixture and about forty degrees centigrade, 22-N-piperidinobisnor-4,20(22)-choladien-3-one with chromic acid, in the ratio of one mole of steroid to about one to ten moles of chromic acid, and recovering the progesterone thus-produced.

8. A process for the production of a useful 20-keto steroid by the oxidative cleavage of the 20(22) double bond of a 22-tertiaryamino-20(22)-unsaturated compound of the bisnorcholane series, which includes mixing together, in solution in a water immiscible organic solvent, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with an aqueous solution of chromic acid, and recovering the thus-produced 20-keto steroid.

9. A process for the production of a useful 20-keto steroid by the oxidative cleavage of the 20(22) double bond of a 22-tertiaryamino-20(22)-unsaturated compound of the bisnorcholane series, which includes mixing together, in solution in methylene chloride solvent, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with an aqueous solution of chromic acid, and recovering the thus-produced 20-keto steroid.

10. A process for the production of a useful 20-keto steroid by the oxidative cleavage of the 20(22) double bond of a 22-tertiary-amino-20(22)-unsaturated compound of the bisnorcholane series, which includes mixing together, in solution in a water-immiscible organic solvent, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with an aqueous solution of chromic acid, in the ratio of one mole of steroid to about one to ten moles of chromic acid, and recovering the thus-produced 20-keto steroid.

11. A process for the production of a useful 20-keto steroid by the oxidative cleavage of the 20(22) double bond of a 22-tertiaryamino-20(22)-unsaturated compound of the bisnorcholane series, which includes mixing together, in solution in a water-immiscible organic solvent, at a temperature between about the freezing point of the mixture and about forty degrees centigrade, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with an aqueous solution of chromic acid, in the ratio of one mole of steroid to about one to ten moles of chromic acid, and recovering the thus-produced 20-keto steroid.

12. A process for the production of progesterone by the oxidative cleavage of the 20(22) double bond of 22-N-piperidinobisnor-4,20(22)-choladien-3-one which includes mixing together, in solution in methylene chloride solvent, at a temperature between about the freezing point of the mixture and about forty degrees centigrade, 22-N-piperidinobisnor-4,20(22)-choladien-3-one with an aqueous solution of chromic acid, in the ratio of one mole of steroid to about one to ten moles of chromic acid, and recovering the progesterone thus-produced.

13. A process for the production of a useful 20-keto steroid by the oxidative cleavage of the 20(22) double bond of a 22-tertiaryamino-20(22)-unsaturated compound of the bisnorcholane series, which includes mixing together, in solution in a dilute solution of an inorganic acid, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein nitrogen is part of the ring, with chromic acid, and recovering the thus-produced 20-keto steroid.

14. A process for the production of a useful 20-keto steroid by the oxidative cleavage of the 20(22) double bond of a 22-tertiaryamino-20(22)-unsaturated compound of the bisnorcholane series, which includes mixing together, in solution in a dilute solution of sulfuric acid, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with chromic acid, and recovering the thus-produced 20-keto steroid.

15. A process for the production of a useful 20-keto steroid by the oxidative cleavage of the 20(22) double bond of a 22-tertiaryamino-20(22)-unsaturated compound of the bisnorcholane series, which includes mixing together, in solution in a five to twenty per cent solution of sulfuric acid, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino wherein the nitrogen is part of the ring, with chromic acid, in the ratio of one mole of steroid to about one to ten moles of chromic acid, and recovering the thus-produced 20-keto steroid.

16. A process for the production of a useful 20-keto steroid by the oxidative cleavage of the 20(22)-double bond of a 22-tertiaryamino-20(22)-unsaturated compound of the bisnorcholane series, which includes mixing together, in solution in a five to twenty per cent solution of sulfuric acid, at a temperature between about the freezing point of the mixture and about forty degrees centigrade, a 22-tertiaryamino-20(22)-unsaturated compound of the bisnorcholane series, wherein the tertiary amino radical is selected from the group consisting of dialkylamino, dicycloalkylamino, diaralkylamino, alkyl aralkylamino, aryl alkylamino, and cyclic amino, wherein the nitrogen is part of the ring, with chromic acid, in the ratio of one mole of steroid to about one to ten moles of chromic acid, and recovering the thus-produced 20-keto steroid.

17. A process for the production of progesterone by the oxidative cleavage of the 20 (22) double bond of 22-N-piperidinobisnor-4,20(22)-choladien-3-one which includes mixing together, in solution in a five to twenty per cent solution of sulfuric acid, at a temperature between about the freezing point of the mixture and about forty degrees centigrade, 22-N-piperidinobisnor-4,20(22)- choladien-3-one with chromic acid, in the radio of one mole of steroid to about one to ten moles of chromic acid, and recovering the progesterone thus-produced.

18. A process for the production of a 20-keto compound having a pregnane carbon skeleton which comprises reacting a 22-tertiaryamino-20(22)-unsaturated compound having a bisnorcholane carbon skeleton with chromic acid to obtain said 20-keto compound.

19. In a process for the degradation of a steroid side chain which includes: forming a 22-tertiaryamino-20(22)-unsaturated steroid compound by heating a 22-al of the bisnorcholane series with a secondary amine, and oxidatively cleaving the 22-double bond to form a 22-keto compound; the improvement which comprises reacting said 22-tertiaryamino-20(22)-unsaturated compound of the bisnorcholane series with chromic acid to form the desired 20-keto compound.

20. A process for the production of progesterone by the oxidative cleavage of the 20(22) double bond of a 22-tertiaryamino bisnor-4,20(22)-choladien-3-one which includes mixing together in a solvent a 20-tertiaryamino (bisnor-4,20(22)-choladien-3-one) wherein the tertiaryamino radical is selected from the group consisting of dialkylamino, dicycloalkylamino, diaralkylamino, alkyl arylamino, aryl alkylamino, and cyclic amino, wherein the nitrogen is part of the ring, with chromic acid, and recovering thus-produced progesterone.

21. A process for the production of a useful 20-keto steroid by the oxidative cleavage of the 20(22) double bond of a 22-tertiaryamino-20(22)-unsaturated steroid which includes mixing together in a solvent a 22-enamine of a secondary amine selected from the class consisting of dialkylamino, dicycloalkylamino, diaralkylamino, alkyl arylamino, aryl alkylamino, and cyclic amino, wherein the nitrogen is part of the ring, and a steroid-22-al selected from the class consisting of bisnorcholan-22-al; 3-acetoxybisnorcholan-22-al, 3-benzoyloxybisnorcholan-22-al, 3-heptanoyloxybisnorcholan 22-al, 3-methoxybisnorcholan-22-al, 3-benzyloxybisnorcholan-22-al, 3-ketobisnorcholan-22-al, and 3-ketobisnor-4-cholen-22-al; and the maleic anhydride, maleic acid, and maleic acid diester adducts of bisnor-3,7-choladien-22-al, 3-acetoxybisnor-5,7-choladien-22-al, 3-benzoyloxybisnor-5,7-choladien-22-al, 3-ethoxybisnor-5,7-choladien-22-al, 3-ketobisnor-5,7-choladien-22-al, 3-acetoxy-9,11-oxidobisnor-5,7-choladien-22-al, 3-heptanoyloxy-9,11-oxidobisnor-5,7-choladien-22-al, and 3-keto-9,11-oxidobisnor-5,7-choladien-22-al, with chromic acid, and recovering the thus-produced 20-keto steroid.

References Cited in the file of this patent
UNITED STATES PATENTS
2,461,912   Miescher _____ Feb. 15, 1949
FOREIGN PATENTS
Fieser et al: "Natural Products Related to Phenanthrene," 3rd ed., p. 424-26 (1949).